United States Patent
Beaudoin

(10) Patent No.: US 11,763,133 B2
(45) Date of Patent: Sep. 19, 2023

(54) DATA POINT SUITABILITY DETERMINATION FROM EDGE DEVICE NEURAL NETWORKS

(71) Applicant: Element AI Inc., Montreal (CA)

(72) Inventor: Philippe Beaudoin, Montreal (CA)

(73) Assignee: SERVICENOW CANADA INC., Montreal (CA)

(*) Notice: Subject to any disclaimer, the term of this patent is extended or adjusted under 35 U.S.C. 154(b) by 929 days.

(21) Appl. No.: 16/556,338

(22) Filed: Aug. 30, 2019

(65) Prior Publication Data
US 2020/0074282 A1    Mar. 5, 2020

Related U.S. Application Data

(60) Provisional application No. 62/725,815, filed on Aug. 31, 2018.

(51) Int. Cl.
*G06N 3/045*    (2023.01)
*G06F 17/16*    (2006.01)
*G06N 20/00*    (2019.01)

(52) U.S. Cl.
CPC ............ *G06N 3/045* (2023.01); *G06F 17/16* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2018/0137413 A1* | 5/2018 | Li | G06N 3/0481 |
| 2018/0174051 A1* | 6/2018 | Knittel | G06N 3/084 |
| 2018/0350069 A1* | 12/2018 | Nakano | G16H 30/40 |
| 2019/0122116 A1* | 4/2019 | Choi | G06N 3/0481 |
| 2019/0147323 A1* | 5/2019 | Li | G06N 3/0472 |
| | | | 706/15 |
| 2019/0156180 A1* | 5/2019 | Nomura | G06N 3/063 |
| 2019/0171927 A1* | 6/2019 | Diril | G06N 3/08 |
| 2019/0179795 A1* | 6/2019 | Huang | G06N 3/0445 |

(Continued)

OTHER PUBLICATIONS

Activation Functions and Their Characteristics in Deep Neural Networks, Ding et al., 978-1-5386-1243-9/18 2018 IEEE.*

(Continued)

*Primary Examiner* — David J Stoltenberg
(74) *Attorney, Agent, or Firm* — FASKEN MARTINEAU DUMOULIN LLP; Serge Lapointe

(57) ABSTRACT

Systems and methods relating to machine learning. An edge device runs a new data point on a first neural network and determines activations on the layers within that neural network. The first neural network is a fully trained network based on a second neural network on a server. The activation data for the various layers in the first neural network are, starting with the output layer, sequentially transmitted to the server. The server continuously receives this activation data and continuously compares it with previously encountered activation data for the second neural network. If the received activation data is within an expected range, then the edge device is instructed to stop sending activation data. Otherwise, the server continues to receive the activation data for the other layers until the new data point is received by the server or the activation data is within the expected range of previously encountered activation data.

15 Claims, 3 Drawing Sheets

(56) References Cited

U.S. PATENT DOCUMENTS

2019/0204832 A1* 7/2019 Abeloe .................. G10L 15/22
2021/0081761 A1* 3/2021 Baker .................... G06N 3/045

OTHER PUBLICATIONS

A Multilayer Neural Network with Nonlinear Inputs and Trainable Activation Functions: Structure and Simultaneous Learning Algorithm, Nakayama et al., 0-7803-5529-6/99 1999 IEEE.*

* cited by examiner

DATA POINT SUITABILITY DETERMINATION FROM EDGE DEVICE NEURAL NETWORKS

RELATED APPLICATIONS

This application is a non-provisional patent application which claims the benefit of U.S. Provisional Application No. 62/725,815 filed on Aug. 31, 2018.

TECHNICAL FIELD

The present invention relates to machine learning. More specifically, the present invention relates to systems and methods for use in determining which new data points are to be used in updating a machine learning model.

BACKGROUND

The rise of machine learning in recent years has led to its use in everything from recognizing objects in images to translating documents from one language into another. One possible issue with current methods of machine is in the gathering of new data for use in training better functioning versions of neural networks. Currently, data is gathered and then sent to servers so that the machine learning models installed on those servers (usually in the form of neural networks) can be trained further using that data.

One drawback of the above is that edge devices (i.e. devices at the edge of the data network to which the servers are connected) are often the initial point of contact for new data. New data points may not be sent from the edge device to the server unless these data points are specifically tagged as being new data. One possible solution would be to have the edge device determine if data points are suitable for training newer versions of the machine learning model. However, given that these edge devices are usually devices with limited capabilities and resources (i.e., lesser processor speeds and limited amounts of memory), such an option might simply bog down the edge devices.

Another possible option would be to send all data points from the edge device to the server. The server, having large amounts of resources at its disposal, can determine whether the data points are suitable for use in training the next version of the machine learning model. Unfortunately, this option would waste data transmission bandwidth and would be, in essence, quite inefficient.

From the above, there is therefore a need for methods and devices that can be used to transmit relevant data points from the edge device to the server for use in training later versions of the machine learning model.

SUMMARY

The present invention provides systems and methods relating to machine learning. An edge device runs a new data point on a first neural network and determines activations on the layers within that neural network. The first neural network is a fully trained network based on a second neural network on a server. The activation data for the various layers in the first neural network are, starting with the output layer, sequentially transmitted to the server. The server continuously receives this activation data and continuously compares it with previously encountered activation data for the second neural network. If the received activation data is within an expected range of the previously encountered activation data for the second neural network, then the edge device is instructed to stop sending activation data. Otherwise, the server continues to receive the activation data for the other layers until the new data point is received by the server or the activation data is within the expected range of previously encountered activation data.

In a first aspect, the present invention provides a method for transmitting activation data relating to a first neural network to a server, said first neural network being a version of a second neural network installed on said server, said first neural network having x layers, x being a natural number, the method comprising:
  a) receiving new data for use with said first neural network;
  b) determining activation data for all x layers of said first neural network by passing said new data through said first neural network;
  c) transmitting activation data for said x layers to said server until an exit condition is reached; said exit condition being one of:
    receiving instructions from said server to stop sending activation data; and
    activation data for layer 1 of said first neural network has been transmitted;
  wherein
    if instructions from said server to stop sending activation data are received, said method is terminated;
    if said activation data for layer 1 has been transmitted and no instructions to stop transmitting said activation data have been received from said server, said new data is transmitted to said server;
    said server sends instructions to stop sending activation data when activation data for a specific layer is within an expected range of activation data for a corresponding layer for said second neural network.

In another aspect, the present invention provides a system for transmitting data to a server, the system comprising:
  a first neural network having x layers, said data being activation data relating to a specific layer in said first neural network, said activation data being caused by passing a new data point through said first neural network;
  a processing module for determining if said activation data is to be transmitted to said server;
  a transmit module for transmitting said activation data to said server, said transmit module being controlled by said processing module, said transmit module receiving said activation data from said first neural network;
  a receive module for receiving instructions from said server, said instructions comprising instructions to either continue sending activation data to said server or to stop sending activation data to said server, said receive module sending said instructions from said server to said processing module;
  wherein
    said first neural network is a version of a second neural network installed on said server;
    said system transmits activation data for said x layers of said first neural network to said server until an exit condition is reached, said exit condition being one of:
      receiving instructions from said server to stop sending activation data; and
      activation data for layer 1 of said first neural network has been transmitted;
    said system transmits said new data point to said server if said activation data for layer 1 has been transmitted and no instructions to stop transmitting said activation data have been received from said server;

said server sends instructions to stop sending activation data when activation data for a specific layer is within an expected range of activation data for a corresponding layer for said second neural network.

In another aspect, the present invention provides a method for receiving, at a server, activation data from an edge device, said activation data relating to a first neural network, said first neural network being a version of a second neural network installed on said server, the method comprising:
  a) receiving activation data for a specific layer in said first neural network, said activation data being caused by a new data point encountered by said first neural network;
  b) comparing said activation data for said specific layer with activation data for a corresponding layer in said second neural network;
  c) determining if said activation data for said specific layer is within an expected range of said activation data for said corresponding layer in said second neural network;
  d) based on a result of step c), executing one of:
    causing said edge device to continue sending activation data for at least one more layer in said first neural network if said activation data for said specific layer is not within said expected range;
    sending instructions to said edge device to cause said edge device to stop sending activation data for other layers in said first neural network if said activation data for said specific layer is within said expected range;
  e) repeating steps a)-d) until an exit condition is reached, said exit condition being one of:
    receiving said new data point from said edge device;
    determining that said activation data for said specific layer is within said expected range.

Yet another aspect of the present invention provides non-transitory computer readable media having encoded thereon computer readable and computer executable instructions that, when executed, implements a method for transmitting activation data relating to a first neural network to a server, said first neural network being a version of a second neural network installed on said server, said first neural network having x layers, x being a natural number, the method comprising:
  a) receiving new data for use with said first neural network;
  b) determining activation data for all x layers of said first neural network by passing said new data through said first neural network;
  c) transmitting activation data for said x layers to said server until an exit condition is reached, said exit condition being one of:
    receiving instructions from said server to stop sending activation data; and
    activation data for layer 1 of said first neural network has been transmitted;
  wherein
  if instructions from said server to stop sending activation data are received, said method is terminated;
  if said activation data for layer 1 has been transmitted and no instructions to stop transmitting said activation data have been received from said server, said new data is transmitted to said server;
  said server sends instructions to stop sending activation data when activation data for a specific layer is within an expected range of activation data for a corresponding layer for said second neural network.

A further aspect of the present invention provides non-transitory computer readable media having encoded thereon computer readable and computer executable instructions that, when executed, implements a method for receiving, at a server, activation data from an edge device, said activation data relating to a first neural network, said first neural network being a version of a second neural network installed on said server, the method comprising:
  a) receiving activation data for a specific layer in said first neural network, said activation data being caused by a new data point encountered by said first neural network;
  b) comparing said activation data for said specific layer with activation data for a corresponding layer in said second neural network;
  c) determining if said activation data for said specific layer is within an expected range of said activation data for said corresponding layer in said second neural network;
  d) based on a result of step c), executing one of:
    causing said edge device to continue sending activation data for at least one more layer in said first neural network if said activation data for said specific layer is not within said expected range;
    sending instructions to said edge device to cause said edge device to stop sending activation data for other layers in said first neural network if said activation data for said specific layer is within said expected range;
  e) repeating steps a)-d) until an exit condition is reached, said exit condition being one of:
    receiving said new datapoint from said edge device;
    determining that said activation data for said specific layer is within said expected range.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
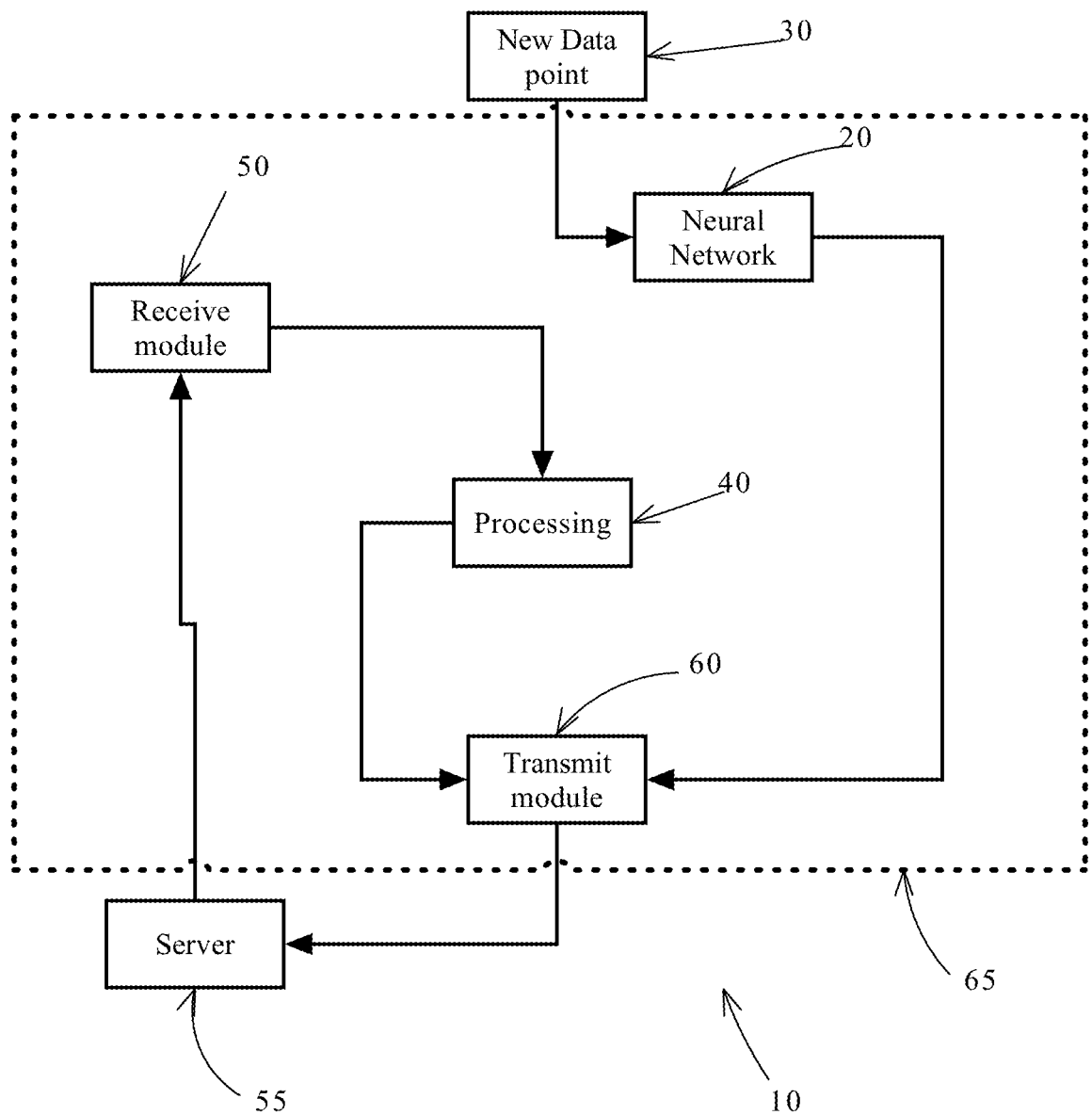
FIG. 1 is a block diagram of a system on which aspects of the invention may be implemented.

The present invention provides systems and methods for transmitting data relevant to the activation of nodes in a neural network. An edge device, that is, a device that is connected to and is at the edge of a data network, has a first neural network installed on it. This first neural network may be a version of a second neural network installed on a server that is also connected to the data network. The first neural network may be a reduced version or some form of the second neural network as the edge device would have less resources and less capabilities than the server. The first and second neural networks would be implementations of a specific machine learning model, albeit similar and related implementations.

It should be clear that, to train a better version of the first and second neural networks, new data will be required. However, as noted above, a question remains as to how to ensure that only relevant data is uploaded to the server for training purposes. Since the edge device encounters new data, it would be logical to have the edge device determine which new data is relevant but, as noted above, given the lesser resources on the edge device, this may not be advisable.

The present invention addresses the above needs by having the edge device pass the new data through the first neural network. The node activations (and the values generated by such activations) in the various layers of the first neural network are then noted. This activation data, on a layer by layer basis, can then be uploaded to the server. The server, when it receives the activation data for a specific layer of the first neural network, then compares this activation data with the activation data for a corresponding layer in the second neural network. If the activation data from the edge device is within an expected range (or a predetermined range) of the activation data for the second neural network, then the activation data is not considered to be "new enough" or "relevant enough". This would mean that the new data encountered by the edge device is not relevant enough and, as such, does not warrant being uploaded to the server to be used in a new training set. However, if the activation data from the edge device is not within an expected range of activation data for the second neural network, then the new data might be relevant enough to warrant inclusion in a new training set. Accordingly, the server would request the edge device (or cause the edge device) to continue sending activation data for other layers.

To ensure an efficient transfer of data and to ensure that sufficient data is transmitted to the server, the concept of "cuts" is used. A "cut" through a neural network is defined as a set of activations that is necessary and sufficient to determine the value of the logits (i.e. nodes in the last or output level of a neural network). Thus, if a neural network is fully connected (i.e. each layer's nodes are connected to each node in the previous layer), a cut would necessarily mean all the activations from a specific layer. From these activations, the activations for subsequent layers can be generated all the way to the last layer. As an example, for a fully connected neural network having 9 layers, a cut through layer 5 would mean all the activations in all the nodes in layer 5. From these activations, the activations for subsequent layers (i.e. layers 6-9) can be generated. For new data, the new data itself would constitute a cut as the new data can be used to generate all the activations in the neural network.

From the above, the concept of a "cut" should also include the idea that, for a single layer in a neural network, the activation data for less than all the nodes may be sufficient for a "cut". If, for a less than fully connected neural network, not all nodes were connected to the nodes in the previous layer, then the activation data for a proper subset (i.e. less than all) of the nodes in one or more layers may be sufficient. As an example, if layers 7-9 (in a 9 layer neural network) were not fully connected, then for layer 7 only some nodes may be connected to some of the nodes in layer 8. Similarly, for layer 8, not all nodes may be connected to all the nodes in layer 9. Thus, it is possible that nodes A7, B7, C7 in layer 7 are only connected to nodes A8 and B8 in layer 8 (with nodes A8 and B8 only being connected to nodes A7, B7, and C7 in layer 7). For layer 9, node A9 may only be connected to nodes A8 and B8 in layer 8. Thus, a cut through layer 7 may only include the activation data for nodes A7, B7, and C7 as the activation data for those nodes is sufficient to determine the outcome for logit/node A9. Similarly, a cut through layer 8 may only include the activation data for nodes A8 and B8 as this data is sufficient to determine the outcome for node A9 in layer 9.

From the above, the question thus becomes one of determining how to efficiently transmit enough data to the server so that the server can determine whether the new data is new enough or relevant enough to warrant inclusion in a new training set? Since the server would have all the activations in all the layers for different data sets and for different data points used in training the second neural network, the server can suitably compare these activation data sets with activation data from the edge device for a new data point. If the activation data from the edge device is within a predetermined range or is within an expected range of one of these activation data sets for the second neural network, then the new data point that generated the activation data on the edge device is not relevant enough. Because of this, for each new data point, the activation data caused by the new data point for each of the layers must be assessed against the activation data sets for the corresponding layers for the second neural network. If none of the activation data caused by the new data point is within expected ranges of the previously encountered activation data for the second neural network, then the new data point is worth including in the new training set. From the above, the activation data for a "cut" through the first neural network can be uploaded to the server for comparison with the activation data for the second neural network. It should, however, be noted that most cuts would involve activation data for most if not all nodes in a given layer.

From the above, in one implementation of the invention, the activation data for all the layers (but not necessarily for all nodes in those layers) for the first neural network would need to be uploaded and assessed by the server before the new data point can be considered suitable for uploading to the server. Of course, if, at any point while the activation data for these various layers are being uploaded and assessed, the activation data from the edge device is found to be within the expected range of the second neural network's activation data, then the upload of the activation data for the other layers can be stopped.

In one implementation of the concept explained above, the activation data for the output layer of the first neural network is uploaded first. Once uploaded and assessed to not be within the expected range of previously encountered activation data for the second neural network, the activation data for the next layer (i.e., the second topmost layer) can be uploaded. The process continues until all the activation data for the various layers (all uploaded in sequence with the output layers being uploaded before the layers closer to the data point) have been uploaded and assessed. Once all the layers have been accounted for and all the activation data has been assessed to not be within the expected range, then the new data point itself can be uploaded to the server. Thus, for a 9 layer first neural network, the activation data for layer 9 is first uploaded. Once that passes the comparison test, then the activation data for layer 8 is uploaded. Once that passes the comparison test, then the activation data for layer 7 is uploaded. The process continues until, at some point, either the server sends a stop transmission command or the activation data for the last layer (i.e. layer 1) has been transmitted. If the activation data for the last layer (i.e. layer 1) has been transmitted and a stop transmission command has not been received from the server, then the new data point itself is transmitted to the server.

It should be clear that, in other implementations of the present invention, the activation data for less than all of the layers can be transmitted to the server. Any sequence of cuts (or layers) may be transmitted to the server. Thus, as an example, the activation data for the output layer, the $6^{th}$ layer, the $3^{rd}$ layer, and the data point may be selected and transmitted to the server. In another example, the selection of the layers whose activation data is to be transmitted to the server may be determined based on enhancing the efficiency of the differential compression method used to compress the data. It should be clear that the selection of the layers whose activation data is to be transmitted may be based on multiple criteria including optimization of the amount of data to be transmitted to the server, optimization of the efficiency of the differential compression method used to compress the data, and optimization of the transmission conduit between the edge device and the server.

To assist in lowering the bandwidth usage of the multiple data transmissions between the server and the edge device, differential compression techniques may be used when transmitting the activation data for various layers for the first neural network. While there are many differential compression techniques that may be used, the present invention contemplates using previously uploaded activation data and the weight matrices for the first neural network. In one implementation, the activation data for nodes in layer n can be used, in conjunction with the relevant weight matrices for layer n, to differentially compress the activation data for layer n−1. To clarify, one can have a model of the probability distribution over the various activations in layer n−1 and this, along with the weight matrices and the previously uploaded activation data for layer n, can be used to differentially compress the activation data for layer n−1. It should, however, be noted that the above is a specific example. The differential compression method noted above need not be between adjacent layers—differential compression may be applied on non-adjacent layers as well. Thus, while the above uses layers n and n−1, differential compression may also be applied using, for example, layer n and layer n−3 or layer n−5. Differential compression can therefore be used between any pair of layers or any pair of cuts.

As noted above, in one implementation of the present invention, the edge device determines the cuts to be sent to the server based on enhancing differential compression efficiency and/or transmission conduit efficiency. However, the cuts may also be determined ahead of time by the server and an indication of which cuts are to be transmitted from the edge device to the server can be sent to the edge device beforehand. The indication of which cuts are to be sent from the edge device to the server may be sent from the server to the edge device at the same time that the first neural network is transmitted to the edge device. It should be clear that the server may select the sequence of cuts using an optimization process that is based on training data (or any other data set available on the server) used to train the second neural network. For a given data set, different layer sequences or cut sequences can be explored with a view to optimizing one or more metrics. The layer or cut sequences that optimize the selected metrics are then sent to the edge device. These metrics can be used to balance between identifying novel data points and minimizing the number of transmitted bits (i.e. optimizing the transmission conduit).

It should be clear that the layer or cut sequences sent from the server to the edge device can then be used to compare with the activation data caused by the new data point. As above, if the activation data is outside of the expected range of the activations for the layer or cut sequences transmitted from the server to the edge device, then these layer or cut sequences (from the new data point) are then transmitted to the server. The server can then compare this activation data set with the activations from more data sets.

Referring to FIG. 1, a block diagram for a system on which aspects of the invention may be practiced is illustrated. As can be seen, the system 10 includes a neural network 20 that receives new data 30. The new data 30 causes activation data to be generated for the various layers in the neural network 20. A processing module 40 receives instructions from a receive module 50 with the instructions originating from a server 55. Based on the instructions, the processing module determines whether the activation data is transmitted to the server by way of a transmit module 60. If the activation data is to be transmitted, the transmit module 60 issues commands that causes the transmit module 60 to transmit the activation data from the neural network 20 to be transmitted to the server. As noted above, the system in FIG. 1 can be part of or incorporated in an edge device. It should be clear that the components illustrated in FIG. 1 can be hardware or software modules that form part of or work with a suitable edge device 65.

Figure 2:
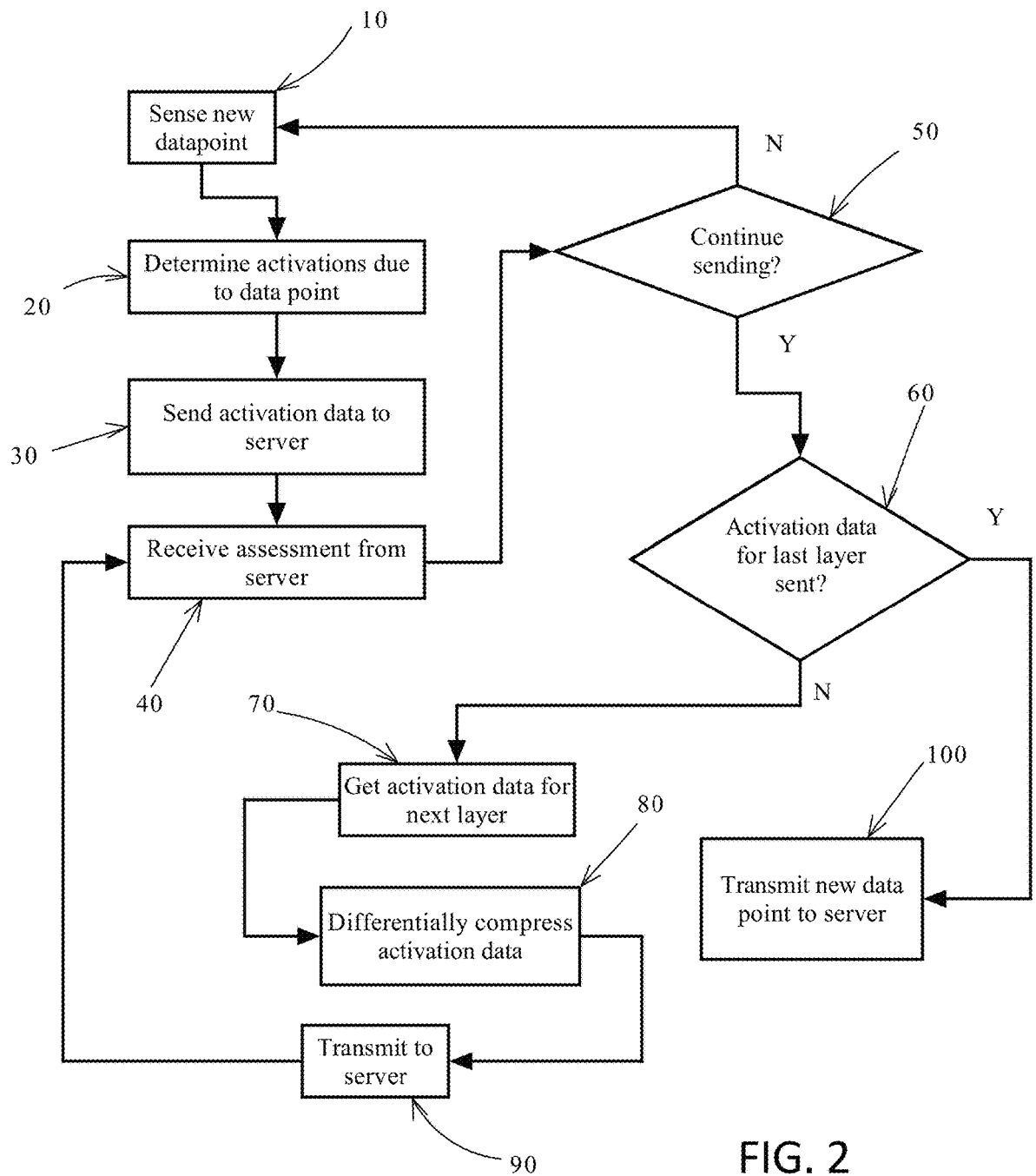
FIG. 2 is a flowchart detailing one method according to one aspect of the invention.

Referring to FIG. 2, a flowchart detailing the steps in a method according to one aspect of the invention is illustrated. This method, as noted above, would be implemented from or in conjunction with an edge device. The method begins at step 10, that of sensing or determining a new data point for the edge device. Once the new data point has been determined, the activation data for the various layers caused by the new data point are determined (step 20). As should be clear to those of skill in the art, this should involve passing the new data point through the first neural network. The activation data for the topmost layer (output layer) in the first neural network is then uploaded to the server (step 30). Afterwards, the assessment from the server as to whether the activation data is within a predetermined range from known activation data is received (step 40). The assessment could include instructions from the server to continue sending activation data for more layers. The decision 50 is therefore whether to continue sending such activation data. This decision may be explicitly caused by instructions from the server to send more activation data or, depending on the configuration, the decision may be one carried out by default. If the decision is one by default, as an example, this could take the form of executing a course of action if something does not occur, e.g., if a STOP SENDING/TRANSMISSION command is not received from the server or is not received within a given amount of time, the transmission of activation data would continue. If such a STOP command is received, then the logic of the method moves back to step 10, that of sensing a new data point for the edge device.

Continuing from above, if such a STOP command has not been received, then the logic of the method moves to decision 60. Decision 60 determines if the activation data for the last layer has been transmitted. If the answer to the query is in the negative, then the activation data for the next layer in the sequence is retrieved (step 70). This activation data is then differentially compressed (step 80) and then transmitted to the server (step 90). The logic then loops back to step 40.

Returning to decision 60, if the activation data for the last layer has already been transmitted, then the last step is that of transmitting the new data point to the server (step 100).

It should be clear that the method detailed in FIG. 2 may be implemented as an exception driven method or as a command driven method. The assessment from the server received in step 40 may be an explicit command to continue sending activation data and the system would follow this command. Alternatively, the assessment may simply be an acknowledgement that the activation data has been received and, absent any other commands from the server, the system continues to send activation data until otherwise told to do so or until the system runs out of activation data to send. This may, of course, occur if the activation data for the last layer has already been sent. Once this has occurred, then the final step (assuming no commands to stop sending activation data has been received from the server) is to send the new data point. The loop would therefore continue until an exit condition has been achieved, with the exit condition being either the reception of a stop command from the server or running out of activation data to send (i.e., the activation data for the last layer has been transmitted). If the exit condition encountered is that of running out of layers, then the last step is that of sending the new data point to the server.

Figure 3:
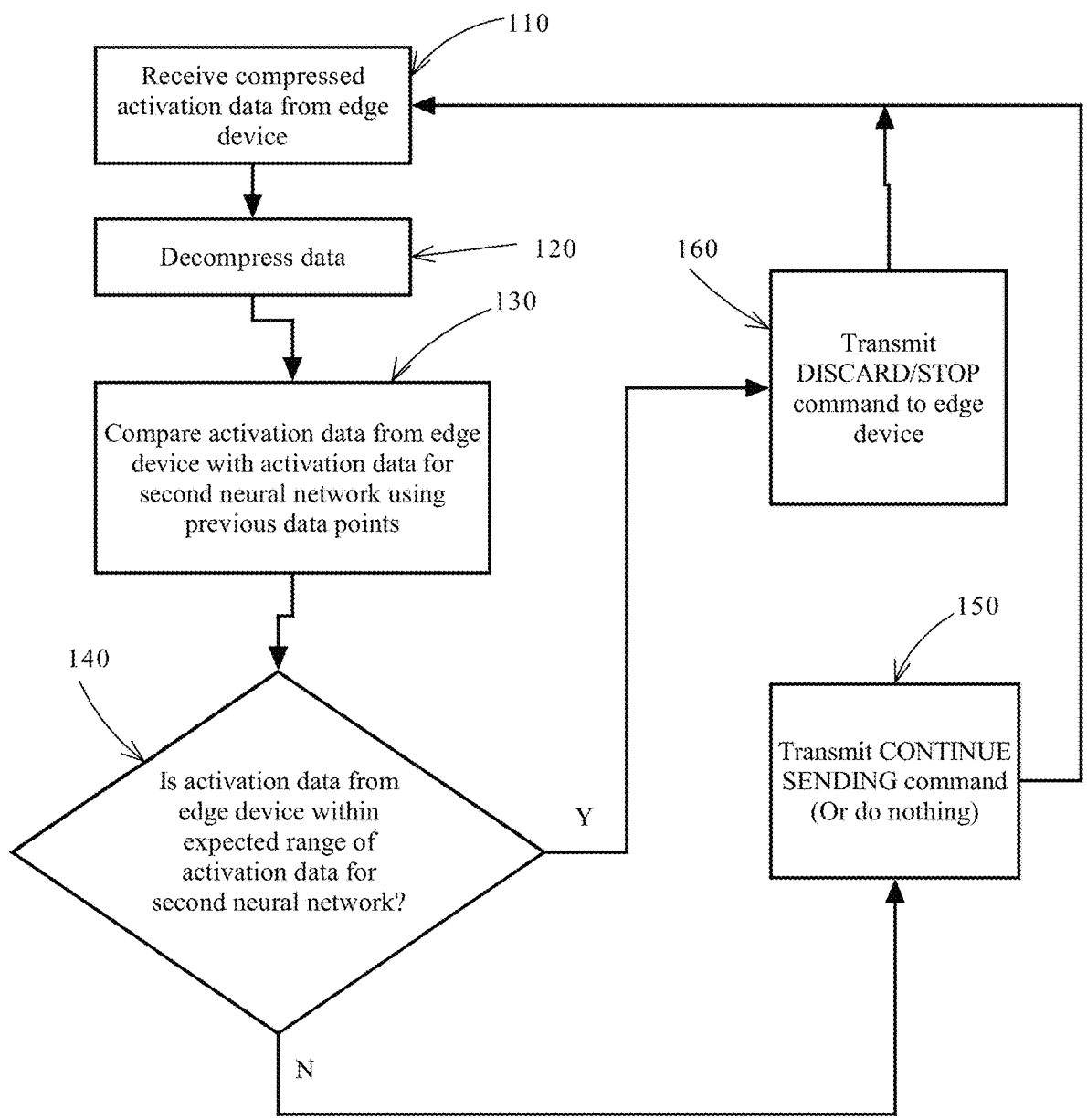
FIG. 3 illustrates a flowchart detailing another method according to another aspect of the present invention.

Referring to FIG. 3, detailed in the flowchart is another aspect of the present invention. This aspect involves a method executed on a server and may be implemented in conjunction with the method detailed in FIG. 2. Beginning at step 110, the method starts with receiving compressed activation data for a specific layer in the first neural network. The received data is then decompressed (step 120) and processed. The processing includes comparing the activation data with previous activation data for a corresponding layer in the second neural network (step 130). As noted above, these activation data sets for the second neural network were previously generated and gathered using other data points which may have been used to train the second neural network. Decision 140 then determines if the activation data received in step 110 (from the edge device) is within an expected range of the activation data it was compared with in step 130. If the answer to the query in decision 140 is in the negative, then the server transmits a CONTINUE SENDING command or, depending on the implementation, does nothing (step 150). The server thus causes the transmitting device (i.e. the edge device) to continue sending activation data for other layers in the first neural network. The logic of the method then loops back to step 110, that of receiving activation data for the next layer.

Returning to decision 140, if the activation data received from the edge device is within the expected range of previous activation data for the second neural network, the server then transmits a STOP command to cause the edge device to stop sending further activation data and to discard the new data point as a possible entry in a new training data set (step 160).

It should be clear that the term "edge device" may include many types of devices including mobile computing platforms (e.g., mobile phones, smartphones, laptops, etc.), desktops, and other data processing platforms that are coupled to a data network and that encounter new data that may be useful for use in a new training set for both the first and second neural networks. Of course, the term "server" may include servers, server farms, cloud computing, and cloud/GPU cluster data processing platforms coupled to a data network so that the edge device may communicate with them. The data network may be any suitable data communications network suitable for transferring data from one data processing platform to another data processing platform.

It should be clear that, while the methods in FIGS. 2 and 3 refer to differentially compressed activation data, the methods may be implemented without using differential compression method or without even using any data compression methods. Such compression methods, however, are recommended as they may save on data bandwidth used when transmitting the activation data from the edge device to the server.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for transmitting activation data relating to a first neural network to a server, said first neural network being a version of a second neural network installed on said server, said first neural network having x layers, x being a natural number, the method comprising:
    a) receiving new data for use with said first neural network;
    b) determining activation data for all x layers of said first neural network by passing said new data through said first neural network;
    c) transmitting activation data for said x layers to said server until an exit condition is reached, said exit condition being one of:
        receiving instructions from said server to stop sending activation data; and
        activation data for layer 1 of said first neural network has been transmitted;
    wherein
    if instructions from said server to stop sending activation data are received, said method is terminated;
    if said activation data for layer 1 has been transmitted and no instructions to stop transmitting said activation data have been received from said server, said new data is transmitted to said server;
    said server sends instructions to stop sending activation data when activation data for a specific layer is within an expected range of activation data for a corresponding layer for said second neural network.

2. The method according to claim 1, wherein said activation data for said layers of said first neural network is differentially compressed prior to transmitting said activation data to said server.

3. The method according to claim 2, wherein for each layer n whose activation data is to be transmitted, said activation data is differentially compressed using previously transmitted activation data and weight matrices for a specific layer n+1 in said first neural network.

4. The method according to claim 1, wherein said activation data for a specific layer in said first neural network comprises activation data for a proper subset of nodes in said specific layer.

5. The method according to claim 1, wherein said activation data for a specific layer in said first neural network comprises activation data for all nodes in said specific layer.

6. The method according to claim 1, wherein said step of transmitting activation data for said x layers to said server begins with transmitting activation data for layer x for said first neural network.

7. The method according to claim 1, wherein said step of transmitting activation data for said x layers to said server is executed by first transmitting activation data for layer x for said first neural network and then transmitting activation data for subsequent layers in reverse sequence.

8. A system for transmitting data to a server, the system comprising:
    a first neural network having x layers, said data being activation data relating to a specific layer in said first neural network, said activation data being caused by passing a new datapoint through said first neural network;
    a processing module for determining if said activation data is to be transmitted to said server;
    a transmit module for transmitting said activation data to said server, said transmit module being controlled by said processing module, said transmit module receiving said activation data from said first neural network;
    a receive module for receiving instructions from said server, said instructions comprising instructions to either continue sending activation data to said server or to stop sending activation data to said server, said receive module sending said instructions from said server to said processing module;
    wherein
    said first neural network is a version of a second neural network installed on said server;
    said system transmits activation data for said x layers of said first neural network to said server until an exit condition is reached, said exit condition being one of:
        receiving instructions from said server to stop sending activation data; and
        activation data for layer 1 of said first neural network has been transmitted;
    said system transmits said new data point to said server if said activation data for layer 1 has been transmitted and no instructions to stop transmitting said activation data have been received from said server;
    said server sends instructions to stop sending activation data when activation data for a specific layer is within an expected range of activation data for a corresponding layer for said second neural network.

9. The system according to claim 8, wherein said system differentially compresses said activation data prior to transmitting said activation data to said server.

10. The system according to claim 9, wherein said activation data is differentially compressed using previously transmitted activation data and weight matrices for a specific layer in said first neural network.

11. A method for receiving, at a server, activation data from an edge device, said activation data relating to a first neural network, said first neural network being a version of a second neural network installed on said server, the method comprising:
    a) receiving activation data for a specific layer in said first neural network, said activation data being caused by a new data point encountered by said first neural network;
    b) comparing said activation data for said specific layer with activation data for a corresponding layer in said second neural network;
    c) determining if said activation data for said specific layer is within an expected range of said activation data for said corresponding layer in said second neural network;
    d) based on a result of step c), executing one of:
        causing said edge device to continue sending activation data for at least one more layer in said first neural network if said activation data for said specific layer is not within said expected range;
        sending instructions to said edge device to cause said edge device to stop sending activation data for other layers in said first neural network if said activation data for said specific layer is within said expected range;
    e) repeating steps a)-d) until an exit condition is reached, said exit condition being one of:
        receiving said new data point from said edge device;

determining that said activation data for said specific layer is within said expected range.

12. The method according to claim 11, wherein said method further comprises a step of decompressing said activation data for said specific layer prior to step b).

13. The method according to claim 12, wherein said activation data for said specific layer is differentially compressed.

14. The method according to claim 13, wherein said activation data for said specific layer is differentially compressed using previously received activation data and weight matrices for another layer in said first neural network.

15. The method according to claim 11, wherein said activation data for said specific layer in said first neural network comprises activation data for a proper subset of nodes in said specific layer.

* * * * *